United States Patent [19]

Eineichner et al.

[11] 4,274,783
[45] Jun. 23, 1981

[54] CHAIN MEASURING AND CONVEYOR CONTROL SYSTEM

[75] Inventors: Donald E. Eineichner, San Jose; Barclay J. Tullis, Palo Alto, both of Calif.

[73] Assignee: FMC Corporation, San Jose, Calif.

[21] Appl. No.: 930,771

[22] Filed: Aug. 3, 1978

Related U.S. Application Data

[62] Division of Ser. No. 800,834, May 26, 1977, Pat. No. 4,198,758.

[51] Int. Cl.³ .................. B65G 43/00; B65G 47/34
[52] U.S. Cl. .................. 414/134; 198/356; 198/365; 235/92 DN
[58] Field of Search .................. 414/134–136; 33/125 R, 127, 129, 132 R, 140, 141 B; 198/348, 358, 365, 367, 356; 235/92 DN

[56] References Cited

U.S. PATENT DOCUMENTS

| 2,782,515 | 2/1957 | Mayes |
|---|---|---|
| 2,825,476 | 3/1958 | Muller |
| 2,977,003 | 3/1961 | Muller |
| 3,050,857 | 8/1962 | Pierce et al. |
| 3,096,871 | 7/1963 | Anderson |
| 3,180,995 | 4/1965 | Briggs et al. |
| 3,242,342 | 3/1966 | Gabar |
| 3,448,870 | 6/1969 | Gallo et al. |
| 3,548,168 | 12/1970 | Beck |
| 3,563,395 | 2/1971 | Gary |
| 3,572,484 | 3/1971 | Richins |
| 3,667,588 | 6/1972 | Traube |
| 3,696,946 | 10/1972 | Hunter et al. |
| 3,725,867 | 4/1973 | Jordan |
| 3,734,433 | 5/1973 | Metzner |
| 3,738,475 | 6/1973 | Lee et al. |
| 3,786,939 | 6/1974 | Habegger |
| 3,815,723 | 6/1974 | Wright et al. |
| 3,868,643 | 2/1975 | Bullivant |
| 3,880,298 | 4/1975 | Habegger et al. |
| 3,899,831 | 8/1975 | DeLeon |

Primary Examiner—Stephen G. Kunin
Assistant Examiner—R. B. Johnson
Attorney, Agent, or Firm—A. J. Moore; R. B. Megley

[57] ABSTRACT

Apparatus for selectively discharging load carriers at a predetermined one of discharge stations. The carriers are connected to an endless chain. The chain is made of links of approximate equal length, which are divided into segments of an equal number of links. The position of each carrier is determined by a control system that measures the actual length of segments of the chain and keeps a record of the lengths of the segments which extend between a reference point and the position of the each carrier. When the length of the chain between the reference point and the carrier equal the known distance along the chain path between the reference point and the preselected discharge station a mechanism is actuated to remove the load from the carrier. In the preferred form of the invention the instantaneous length of chain between the reference point and each carrier is determined by a control system which computes and compare the nominal, or standard length of a portion of the chain with the actual measured correspond portion. Periodically, the actual measured length of the segment is substituted for the nominal length of the memory of the control system. When a predetermined set of conditions are met, a mechanism at a discharge station is actuated to discharge a load from the carrier.

11 Claims, 22 Drawing Figures

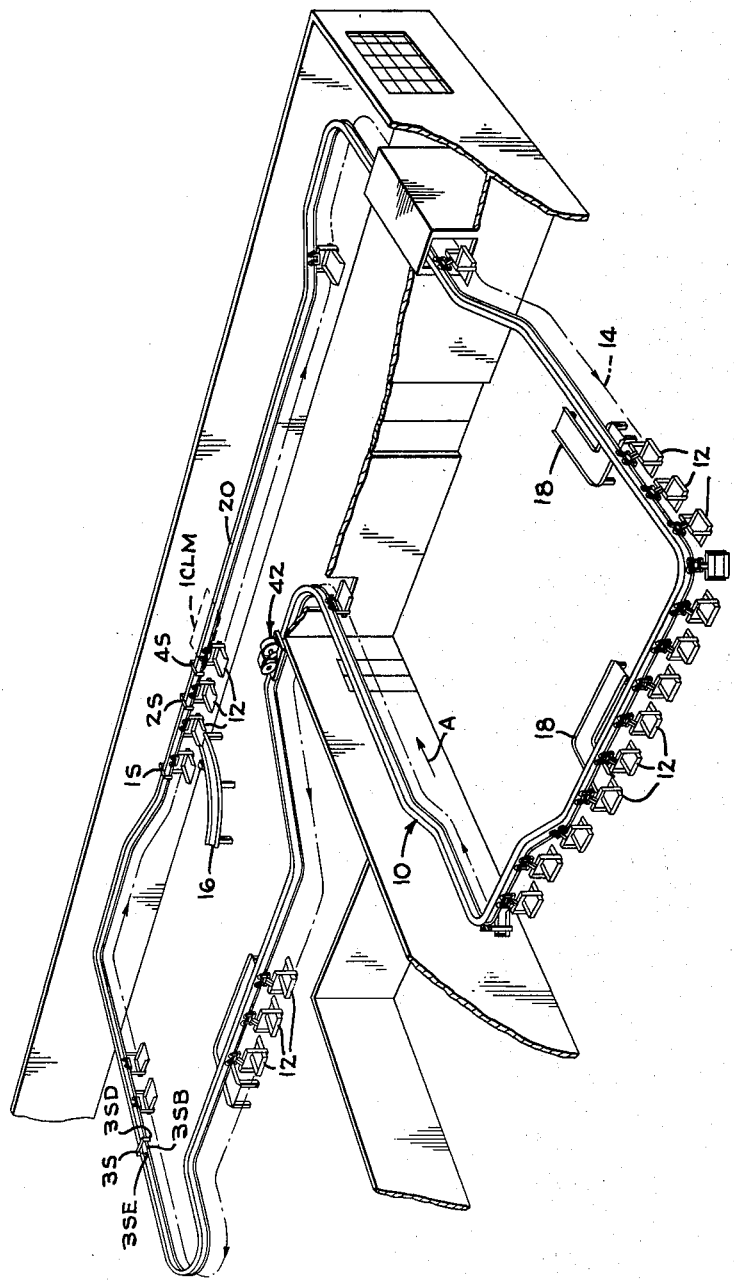
FIG_1

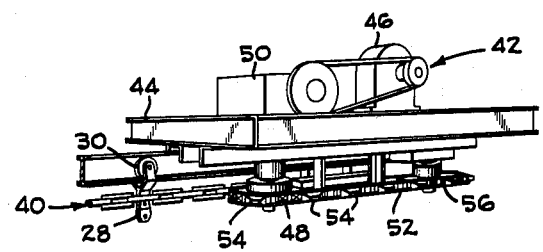
FIG_2
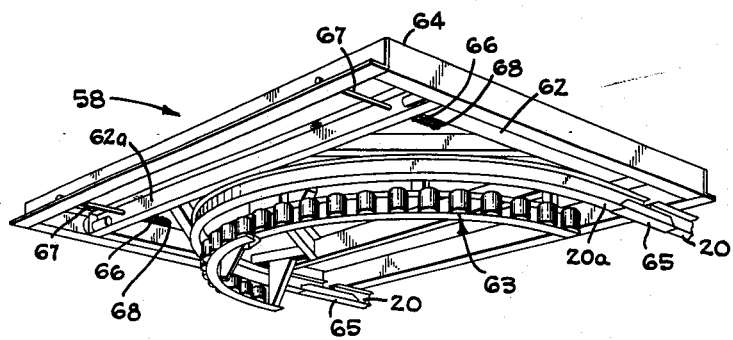
FIG_3

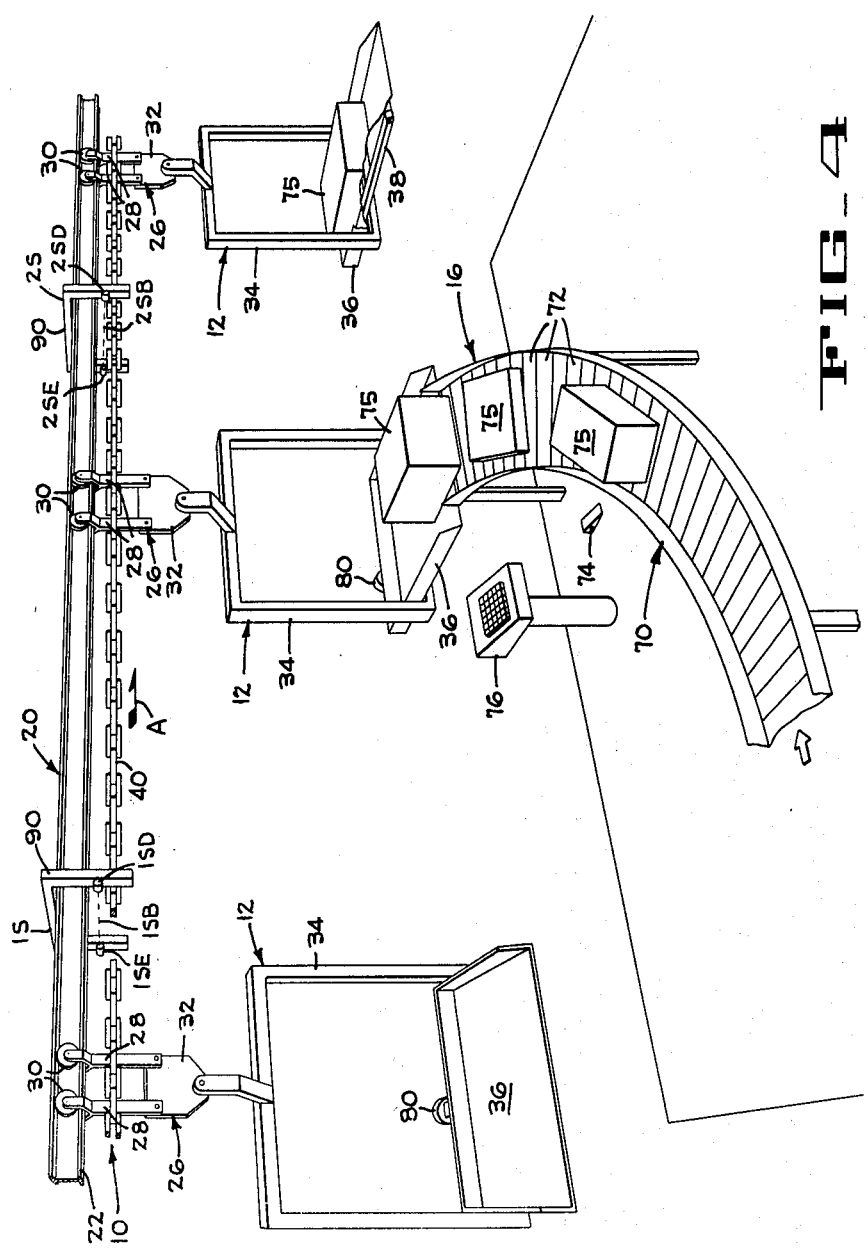
FIG_4

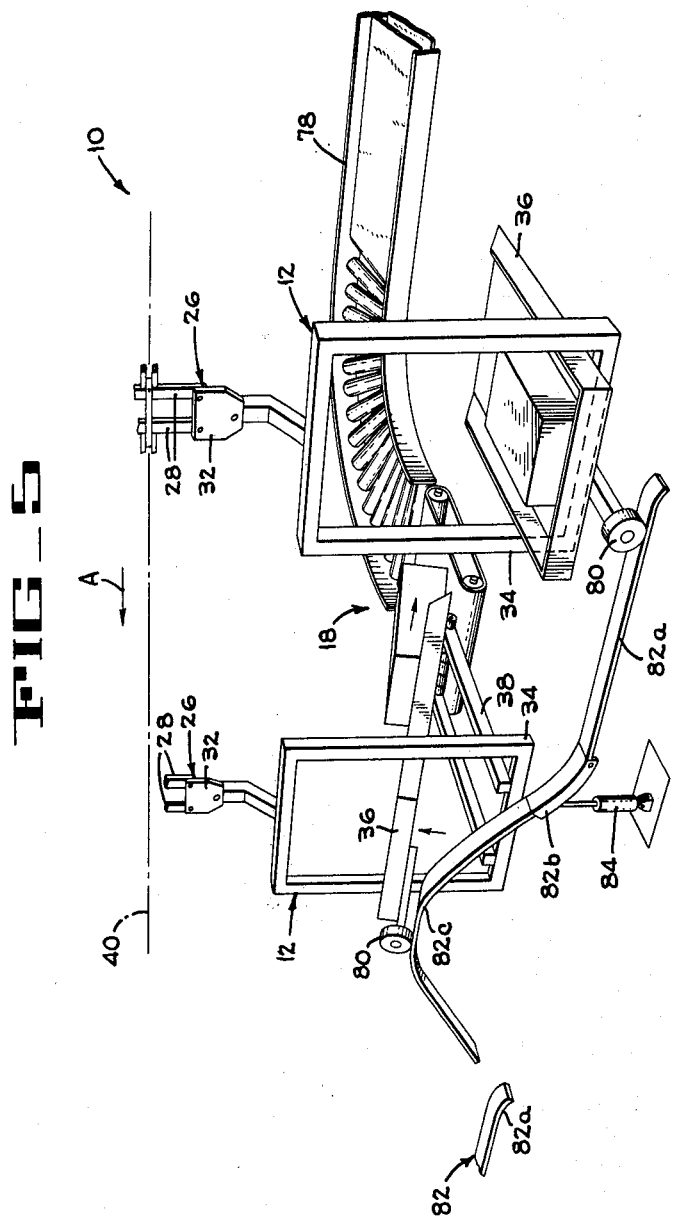

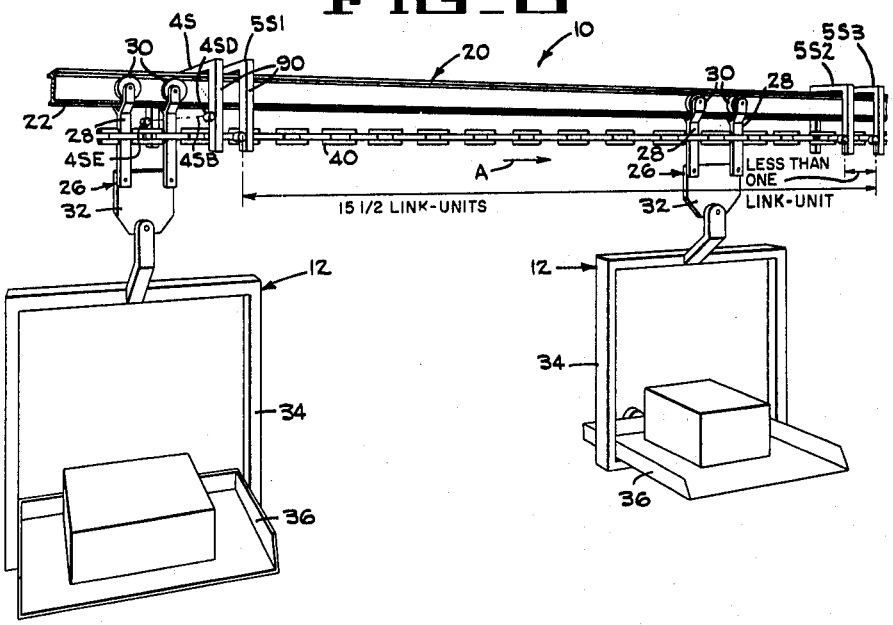
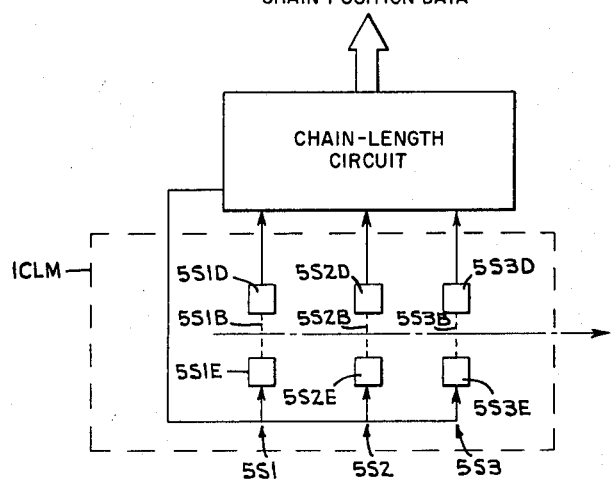

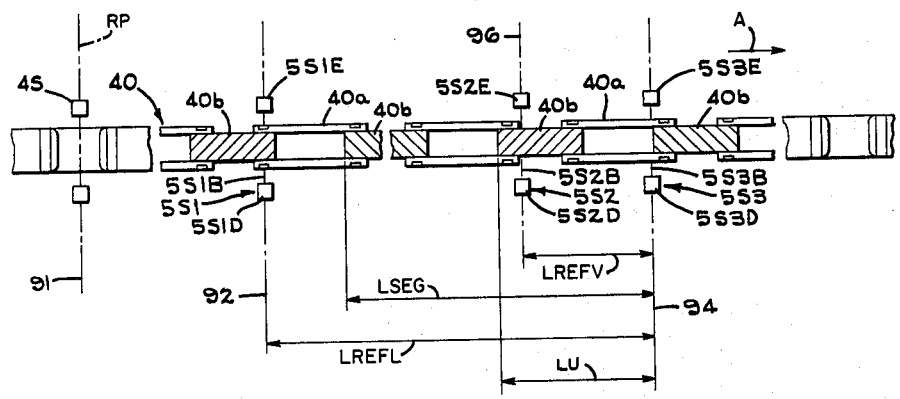
FIG_8
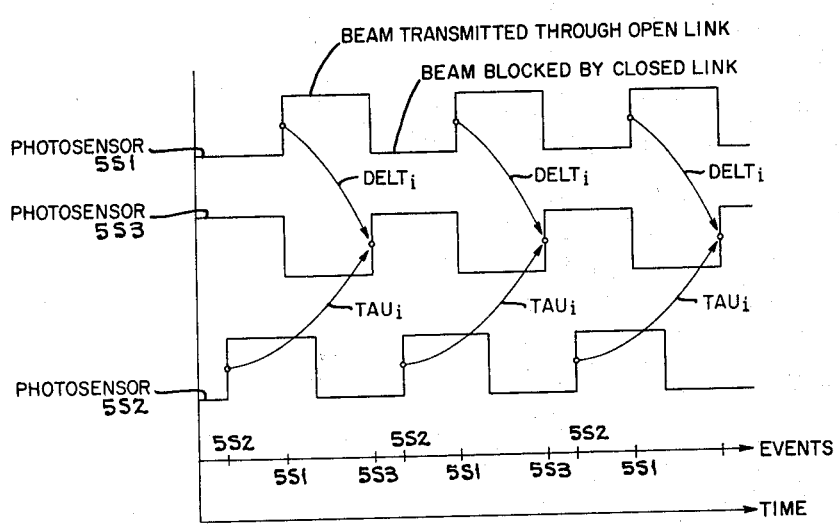
FIG_9

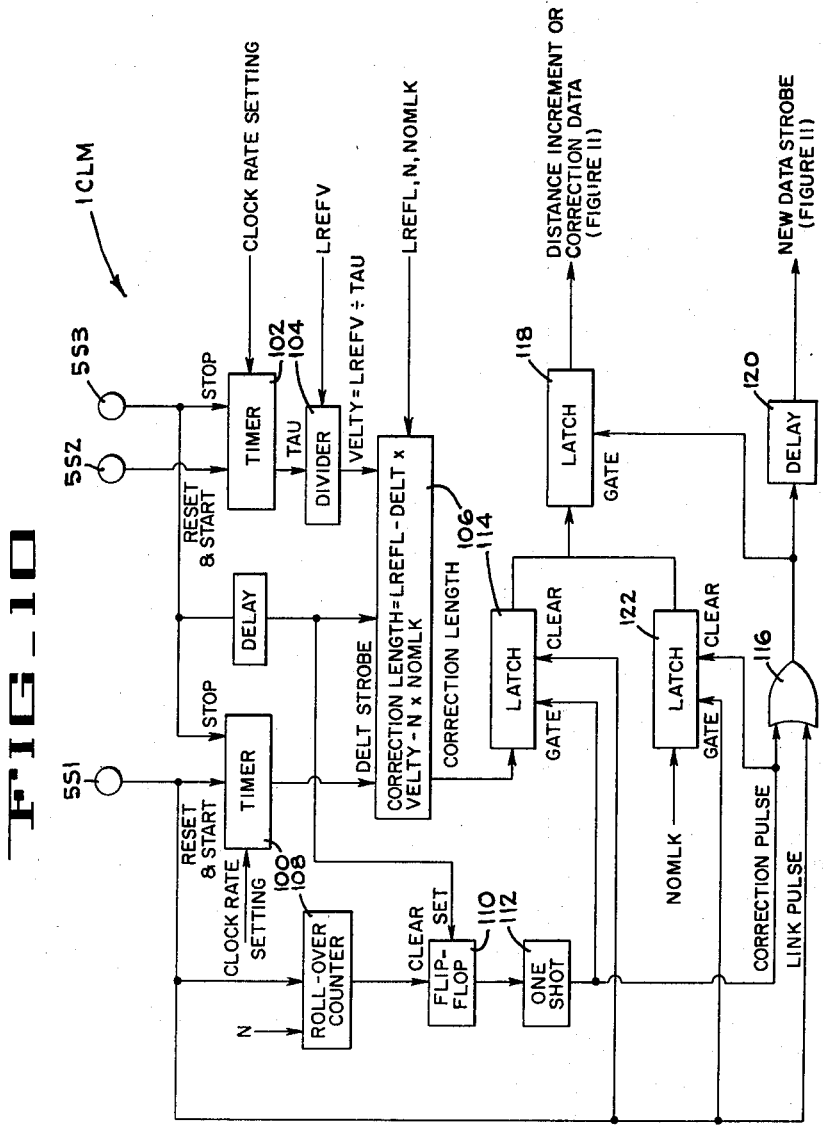

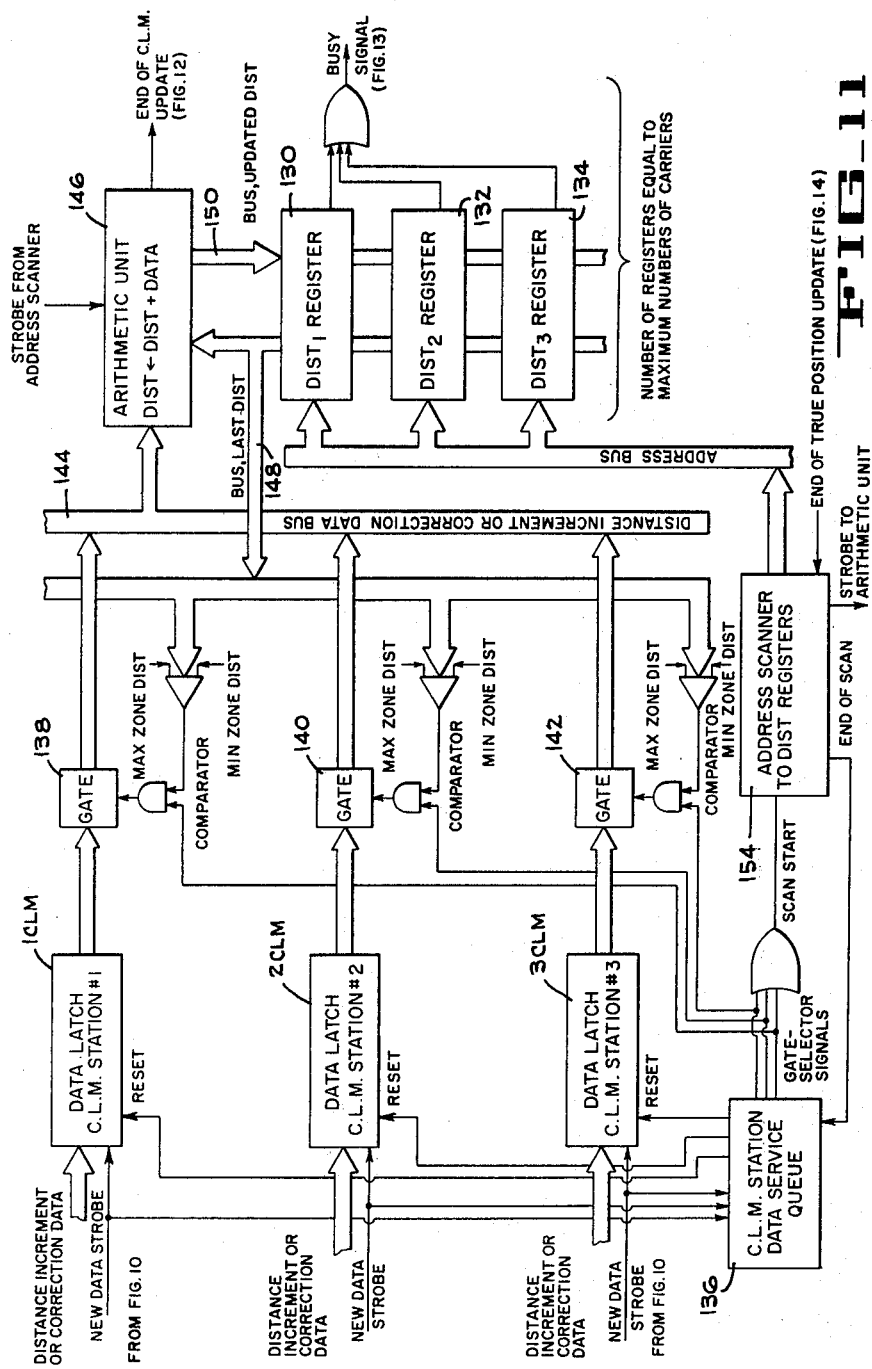

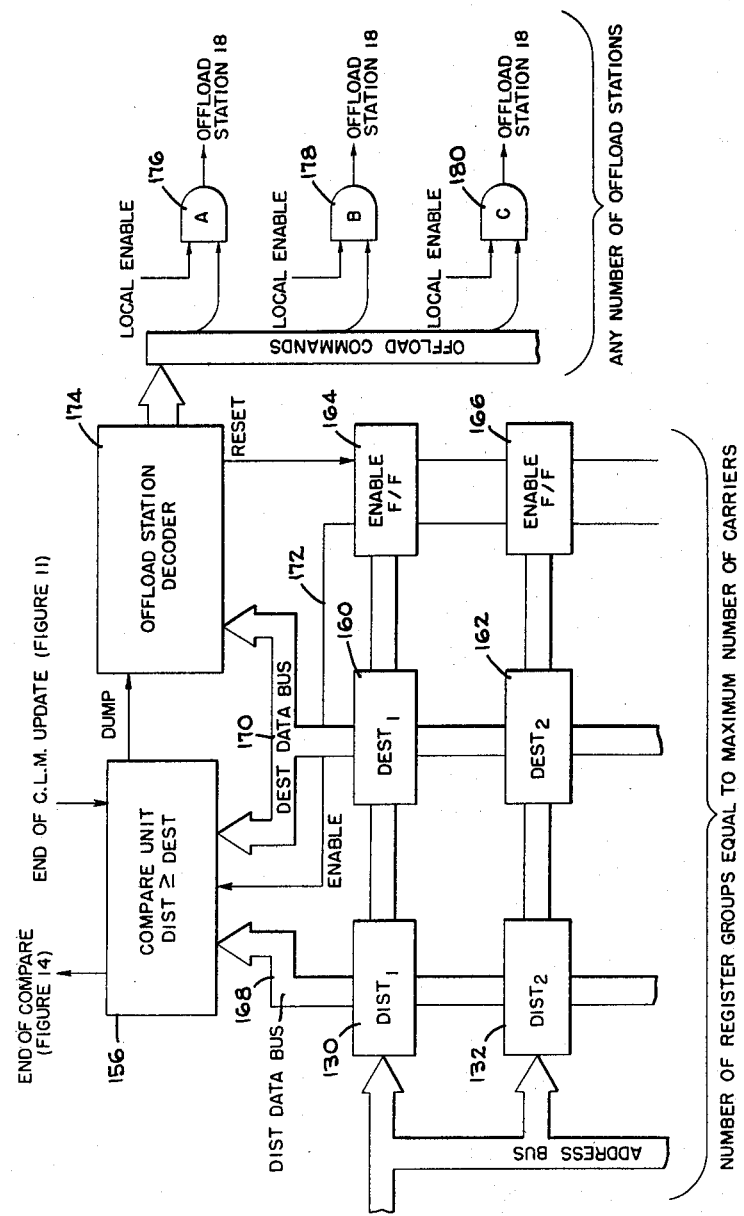
FIG_12

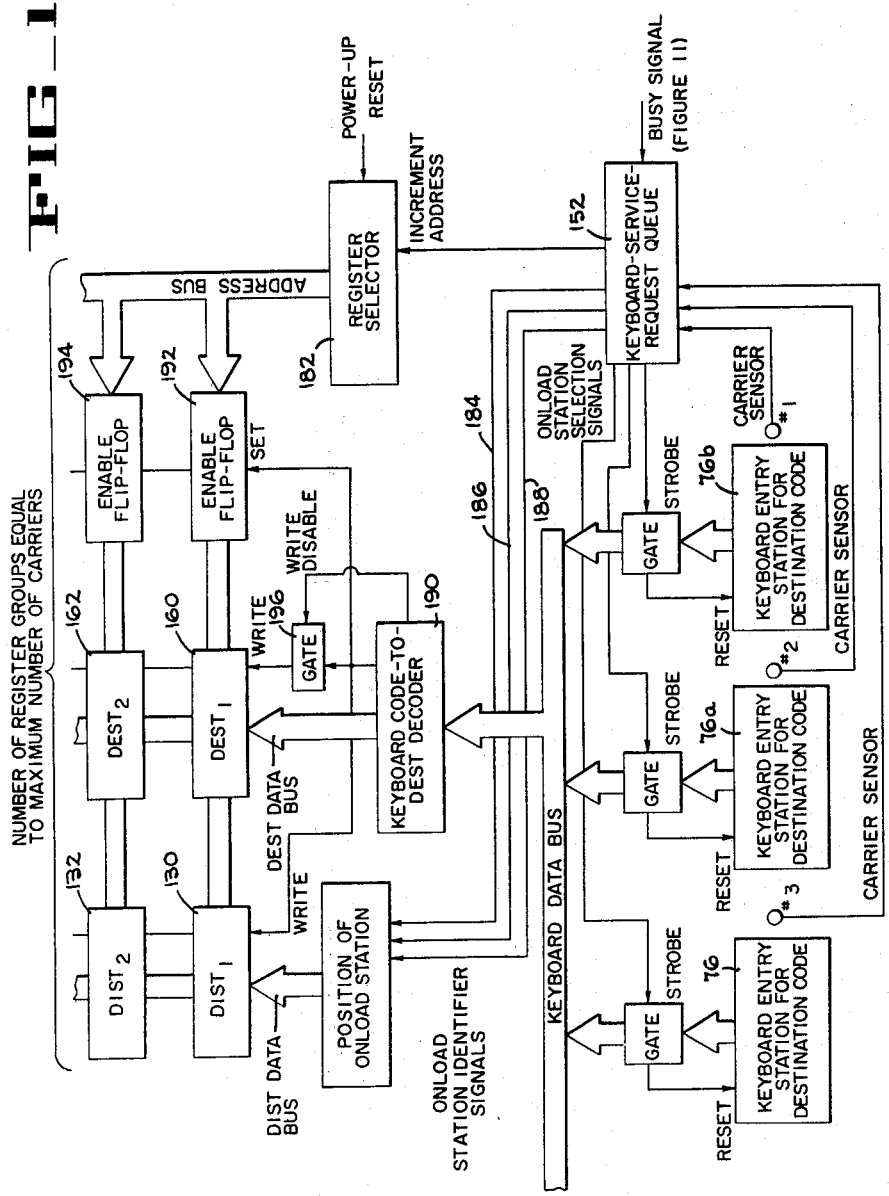

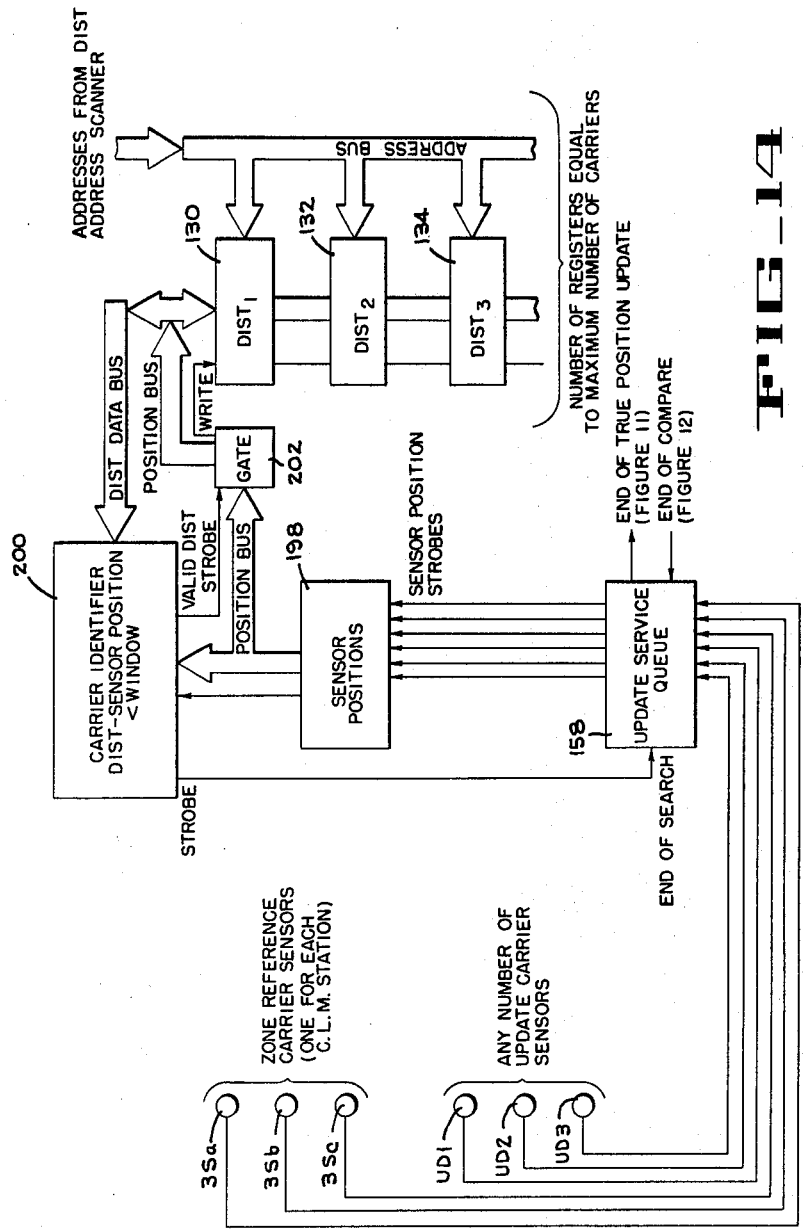

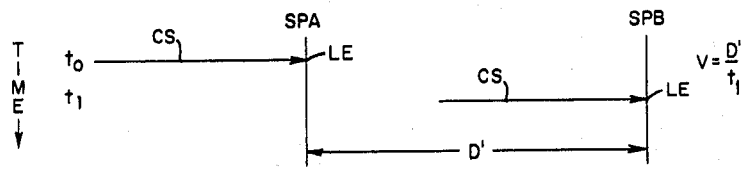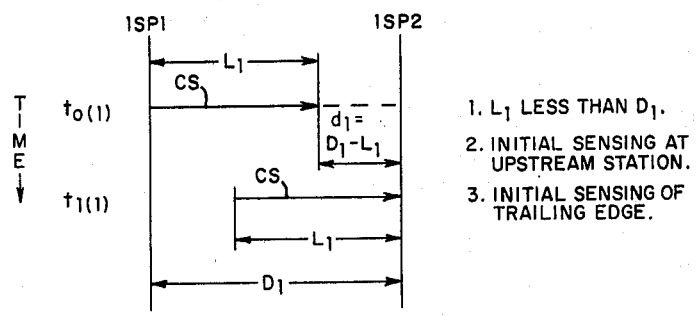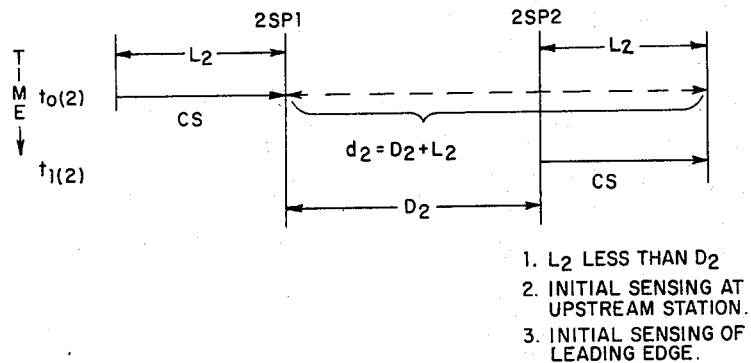

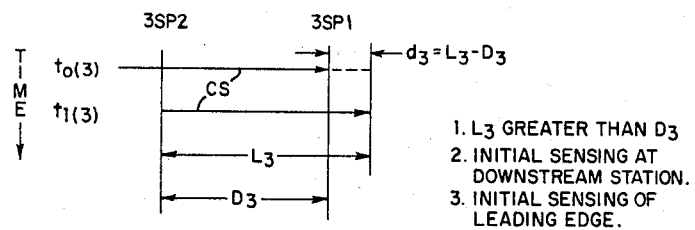
FIG_18
1. $L_3$ GREATER THAN $D_3$
2. INITIAL SENSING AT DOWNSTREAM STATION.
3. INITIAL SENSING OF LEADING EDGE.
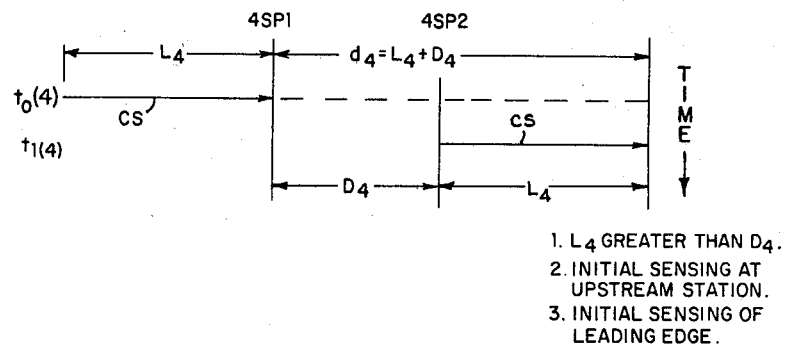
1. $L_4$ GREATER THAN $D_4$.
2. INITIAL SENSING AT UPSTREAM STATION.
3. INITIAL SENSING OF LEADING EDGE.
FIG_19

FIG_20
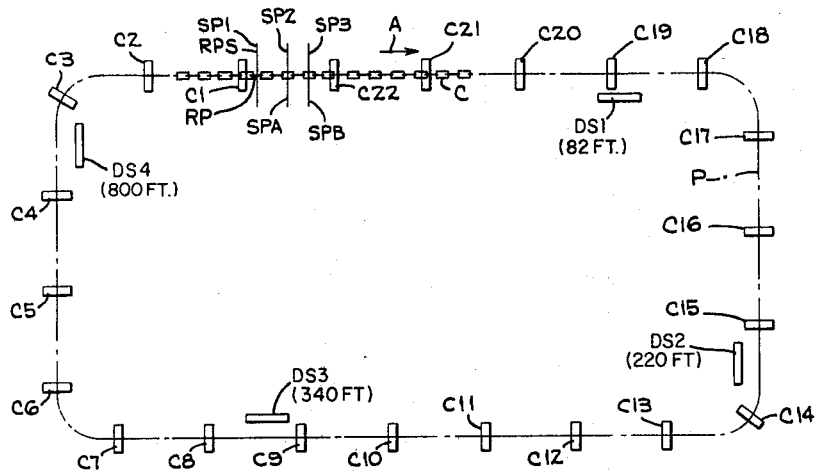
FIG_21
| | (1) | (2) | (3) | (4) | (5) | (6) |
|---|---|---|---|---|---|---|
| | BETWEEN REF. PT. AND CARRIER | | STANDARD LENGTH OF SEGMENTS (FEET) 10 x (1) | ACTUAL LENGTH OF SEGMENTS (FEET) | STANDARD LENGTH OF EXCESS LINKS (FEET) 8" x (2) | RUNNING TOTAL USED AS ACTUAL LENGTH (4)+(5) (FEET) |
| CARRIER NO. | NO. OF SEGMENTS | NO.OF EXCESS LINKS OVER WHOLE SEGMENTS | | | | |
| C1 | 88 | 12 | 880 | 883 | 8 | 891 |
| C2 | 84 | 3 | 840 | 838 | 2 | 840 |
| C3 | 79 | 9 | 790 | 794 | 6 | 800 |
| ⋮ | ⋮ | ⋮ | ⋮ | ⋮ | ⋮ | ⋮ |
| C20 | 8 | 0 | 80 | 81 | 0 | 81 |
| C21 | 4 | 2 | 40 | 39 | 1 1/3 | 40 1/3 |
| C22 | 0 | 6 | 0 | 0 | 4 | 4 |

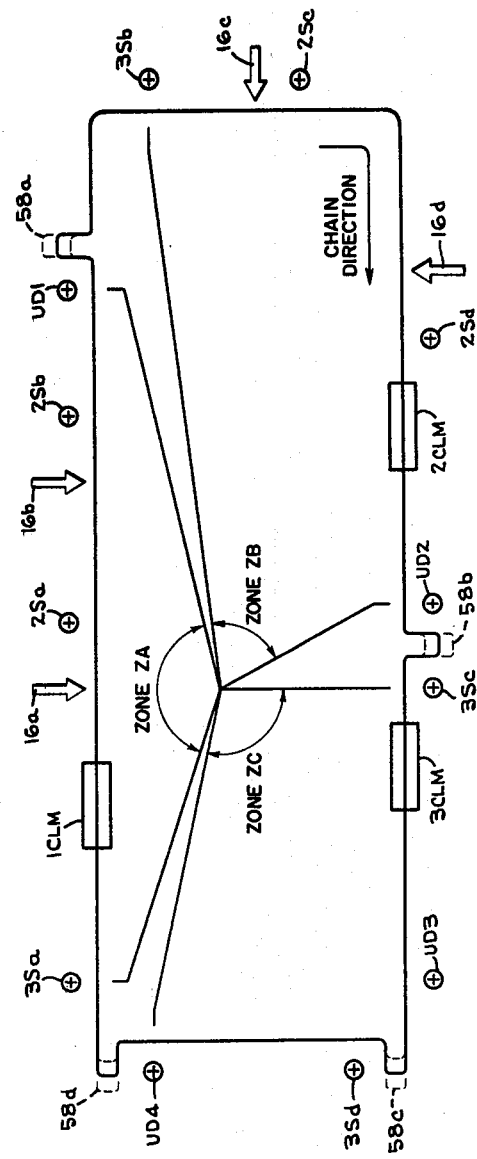

CHAIN MEASURING AND CONVEYOR CONTROL SYSTEM

This is a division, of application Ser. No. 800,834 filed May 26, 1977 now U.S. Pat. No. 4,198,758 issued on Apr. 22, 1980.

BACKGROUND OF THE INVENTION

1. Field of the Invention

The present invention relates to a method and apparatus for measuring chain and for synchronizing the operation of conveyor apparatus, such as a discharge mechanism, with movement of the conveyor carriers by tracking the carriers through their drive chain.

2. Description of the Prior Art

In a typical conveyor system, such as the one shown in the U.S. Pat. No. 3,448,870 of J. R. Gallo et al, a plurality of spaced apart carriers are driven around an endless path by an endless chain. The carriers are loaded (frequently while moving) at one or more loading stations, and discharged (also while moving) at selected discharge stations. A common method of directing a particular carrier to a desired discharge station includes an escort code member mounted on the carrier and set by an operator with a code unique to the desired discharge station. A code reader at the discharge station activates a discharge mechanism to remove the load on the fly from the carrier in response to proximity with, or engagement by, the escort code member.

As conveyor systems become larger, the expense of providing escort code mechanism for each carrier, and providing a code reader for each discharge station, becomes excessive. Moreover, with an increasing amount of code apparatus, the likelihood of malfunctions increases significantly.

Another method of actuating mechanism to discharge a load from a moving carrier at a selected discharge station utilizes a signal carrier which is driven in synchronism with the carriers. The signal carrier may, for example, be a magnetic tape, as shown in the U.S. Pat. No. 2,825,476 of D. C. Muller, which has signals therein to produce a discharge signal in a selected pickup head. One problem with a system of this type is maintaining a sufficiently close synchronism between the movement of the carriers and the movement of the signal carrier.

Counting means have been used to track the carriers in a conveyor system. In one previously described sytem, a sensor, which scans the teeth of a sprocket, generates pulses which advance through a circuit in synchronous timed relation with the carriers (see U.S. Pat. No. 3,815,723). In another system relating to a letter sorting machine, it has been known to use a shaft encoder attached to the drive chain sprocket of the letter cart conveyor to generate a pulse to correspond to the linear advance of the conveyor (see U.S. Pat. No. 3,696,946). In any system where the teeth of a sprocket or the revolutions of a shaft are counted, slack due to wearing or stretching of a conveyor chain can substantially reduce the reliability of the system. It has been found that the length of the conveyor chain of a fixed number of links varies significantly because of manufacturing tolerances, change in chain tension which causes stretch, and wear between pins and bushings.

It will be noted that prior art systems which count or sense sprocket teeth or sprocket shaft rotation to track a carrier, rely on the assumption that links or segments of the chain extending between the point of measurement and the carrier remain constant in length. In effect, the assumed position of the carrier is based on the standard, or nominal chain link length.

It should also be noted that in the prior art, means have been provided to compensate for inaccuracies in the tracking of the carrier. In U.S. Pat. No. 3,815,723, a proximity switch is provided to sense carrier trays adjacent the unloader so that the latter will be actuated in the precise timed relation to the tray to be unloaded. In so doing, any slack or other inaccuracy in the chain that might place the tray in the wrong position relative to the unloader will be overridden and corrected.

Briggs et al, U.S. Pat. No. 3,180,995, shows the measurement of a moving object.

SUMMARY OF THE PRESENT INVENTION

In the present invention, a method and apparatus for measuring chain is disclosed. There is also disclosed a conveyor system having carriers which are driven along a path by a drive chain, and the carriers are tracked by accurate measurement of the carrier drive chain. In accordance with one form of the present invention, the position of each carrier is tracked by measuring the actual length of segments of the chain, and accumulating the lengths of said segments which extend between a reference point and the position of the carrier. When the length of chain between the reference point and the carrier equals the known distance along the chain path between the reference point and the desired discharge station, mechanism is actuated to remove the load from the carrier.

In the preferred form of the invention, a method and apparatus is provided to count link units (comprising two adjacent links) of the chain as the link units pass a reference point. The apparatus includes means to accumulate the nominal, or standard, lengths of the link units, in a running total, for each carrier, to give the instantaneous length of chain between the reference point and the carrier. This instantaneous length of chain for each carrier is carried in a memory unit. After a predetermined number of link units have been counted, the actual length of the segment consisting of said predetermined number of link units is measured. This is done by computing the velocity of the chain and measuring the time required for the opposite ends of the segment to actuate sensors a known distance apart. The nominal length of the segment (which, by way of example only, is 8 inches/link unit×15 link units/segment=120 inches, or ten feet) is then corrected in the memory to record, for each carrier, the actual length for the segment of chain between the reference point and the carrier.

Each individual succeeding link unit is counted as it passes the reference point, and its nominal length is added to the running total of chain length, for each carrier, between the reference point and the carrier, until a second segment has passed the reference point. At that time, the actual length of the second segment is calculated and substituted for the nominal length of the second segment in the running total accumulated in the memory for each carrier. Thus, at any instant, for each conveyor carrier which has left the reference point in its journey to a discharge station, the memory holds an accumulated total distance of that carrier from the reference point comprising the actual lengths of whole chain segments and a nominal length (number of link units times standard length of a link unit) for the fractional segment.

When the distance held by the memory for a particular carrier equals (or exceeds) the known distance from the reference point to the desired discharge station for that carrier (which known distance is also stored in the memory), the discharge mechanism at that station is actuated to discharge the load.

It is therefore one object of the present invention to provide an accurate measurement of the distance of a conveyor carrier from a reference point.

It is another object of the present invention to measure segments of the chain by computing the velocity of the chain.

It is yet another object of the invention to accumulate nominal values of the lengths of links of the chain until a predetermined number of links comprising a segment have been counted, and thereafter measuring the actual length of the segment.

It is yet another object of the present invention to substitute the actual length of a segment of chain for the nominal values of the separate links of the chains.

BRIEF DESCRIPTION OF THE DRAWINGS

FIG. 1 is a view in perspective of a conveyor system incorporating the apparatus of the present invention.

FIG. 2 is a view of the conveyor drive system.

FIG. 3 is a view of the conveyor chain take-up system.

FIG. 4 is a view of a loading station of the conveyor system.

FIG. 5 is a view of a discharge station of the conveyor system.

FIG. 6 is a view of a chain link measuring station in the conveyor system.

FIG. 7 is a schematic diagram of the chain link measuring station of FIG. 6.

FIG. 8 is a plan view of the chain link measuring station of FIG. 6.

FIG. 9 is a schematic diagram of the signals generated in the chain link measuring station of FIG. 6.

FIGS. 10 to 14 inclusive are schematic diagrams of the apparatus for storing data for the control of the conveyor carriers.

FIG. 15 is a schematic diagram illustrating the method of measuring the velocity of the chain.

FIGS. 16 to 19 are schematic diagrams illustrating methods of measuring the length of chain segments.

FIG. 20 is a schematic diagram of the conveyor system.

FIG. 21 is a table illustrating the method of accumulating distances between the reference point and the carriers.

FIG. 22 is a schematic diagram of a modified conveyor system.

DESCRIPTION OF THE PREFERRED EMBODIMENTS

In accordance with one form of the present invention, method and apparatus is provided to permit an accurate discharge of moving carriers at all discharge stations, including remote stations, in a conveyor system. The control over the discharge of the moving conveyors is effected by tracking each carrier of the system through the chain by which the carriers are driven. In order to accomplish this, it is necessary to measure the chain, segment by segment, so that the instantaneous position of each carrier is known at all times.

The method of measuring chain, in accordance with one feature of the present invention, can best be understood by reference to FIGS. 15 to 19, inclusive, wherein the chain segments are shown schematically moving from left to right.

In the method of measuring the length of a longitudinally moving segment of chain, the first step is to determine the velocity of the chain segment CS. As shown in FIG. 15, any point on the chain (which, for convenience, is selected as the leading edge LE of the chain segment) is sensed when it reaches a first sensing point SPA. The leading edge is again sensed when it reaches a second sensing point SPB which is spaced a predetermined, known distance D' from the first sensing point SPA. The length of time $t_1$ (assuming $t_0=0$) it takes the point LE to travel the distance D' between the two sensing points SPA and SPB is measured, and the velocity v is arrived at from the equation $$v = D'/t_1$$

After the velocity of the chain segment is determined, it is necessary to measure the length of time it takes between the passage of one end of the segment past one sensing station and the passage of the opposite end of said segment past another sensing station a known distance from said one sensing station. In other words, both ends of the segment (which is moving at velocity v) must be sensed at different times and at a point or at different points (which are a known distance apart) and the time between the sensings must be measured. The length can then be calculated from the known velocity of the segment, the known distance between sensing points, and the measured time between sensings. The form of the equations giving the length of the segment will depend on which end of the segment is measured first and whether the spacing between the sensing points is greater or less than the length of the segment.

FIG. 16 shows a method of sensing the length of a segment of chain when the velocity v of the chain segment is known. In this embodiment, two sensing points 1SP1 and 1SP2 are spaced apart a distance $D_1$ which is greater than the length $L_1$ of the segment CS to be determined. The movement of the trailing edge of the segment past the first sensing point 1SP1 is sensed, at time $t_{0(1)}$, and the movement of the leading edge of the segment past the second sensing point 1SP2 is sensed, at time $t_{1(1)}$.

It will be noted that every point on the chain segment CS (consider, for example, the leading edge of the segment) travels a distance $d_1$ during the time interval $t_1$ where $$d_1 = D_1 - L_1 = t_1 v$$

and $$t_1 = t_{1(1)} - t_{0(1)}.$$

Therefore $$L_1 = D_1 - d_1 = D_1 - t_1 v.$$

Another embodiment of the chain segment measuring method for a segment moving at velocity v is illustrated in FIG. 17. In this embodiment, as in the embodiment of FIG. 16, the sensing points 2SP1 and 2SP2 are spaced apart a distance greater than the length of the segment CS to be measured. However, in this embodiment, the leading edge of the segment is sensed first (at time $t_{0(2)}$ at upstream sensing point 2SP1) and the trailing edge of the segment is sensed thereafter (at time $t_{1(2)}$ at downstream sensing point 2SP2). Any point on the chain segment (such as the leading edge) travels a distance $d_2 = D_2 + L_2$. The distance $d_2$ is also equal to $v\ t_2$ where $t_2 = t_{1(2)} - t_{0(2)}$ and so therefore $$d_2 = D_2 + L_2 = v\ t_2$$

$$L_2 = d_2 - D_2 = v\ t_2 - D_2.$$

In the embodiment of FIG. 18, the distance $D_3$ between sensing points 3SP1 and 3SP2 is less than the length $L_3$ of the segment to be measured. In this embodiment, the leading edge of the segment is sensed first, at time $t_{0(3)}$, at the downstream sensing point 3SP1 and, thereafter, the trailing edge of the segment is sensed, at time $t_{1(3)}$, at the upstream sensing point 3SP2. Any point, such as the leading edge, of the segment travels, at velocity v, the distance $d_3 = L_3 - D_3$ in the time $t_3 = t_{1(3)} - t_{0(3)}$. The distance $d_3$ also equals $v\ t_3$ so that $$d_3 = L_3 - D_3 = v\ t_3$$

and $$L_3 = d_3 + D_3 = v\ t_3 + D_3$$

In the arrangement of FIG. 19, the distance $D_4$ between an upstream sensing point 4SP1 and a downstream sensing point 4SP2 is less than the length $L_4$ of the chain segment CS to be measured and, in fact, can be zero. In this embodiment, the leading edge of the segment is sensed at time $t_{0(4)}$ at the upstream sensing point 4SP1 and the trailing edge of the segment is sensed thereafter at time $t_{1(4)}$ at the downstream sensing point. Any point, such as the leading edge of the segment, travels a distance $d_4 = L_4 + D_4$ in the time $t_4 = t_{1(4)} - t_{0(4)}$. The distance $d_4$ also equals $v\ t_4$ where $v$ is the velocity of the segment so that $$L_4 = d_4 - D_4 = v\ t_4 - D_4.$$

If distance $D_4 = 0$, sensors 4SP1 and 4SP2 can be replaced by a single sensor.

The measurement of chain segment lengths is used in the method of controlling the discharge of carriers at selected discharge stations as indicated in FIGS. 20 and 21.

There is shown in FIG. 20 an endless chain C to which carriers C1 to C22 are connected for transport around the endless path P defined by the chain C. Discharge stations are located along the path of the carriers to receive articles from the carriers. The discharge stations are indicated as follows (with exemplary known distances from a reference point RP given in parentheses): DS1 (82 feet); DS2 (220 feet); DS3 (340 feet); and DS4 (800 feet).

As previously described, sensing points SPA and SPB are used to determine the velocity of the chain; and sensing points, such as sensing points 1SP1 and 1SP2 (FIG. 16) are used to determine the length of chain segments. As will be more fully described hereinafter, three sensing points SP1, SP2 and SP3, which sense the chain, are preferably used in measuring the lengths of the segments. SPA and SPB may, for convenience, be at the same location as sensing points SP2 and SP3. For convenience, the sensing point SP1 may lie in the same vertical plane with the reference point FRP, where the carriers are sensed.

The chain is made up of links, every other link being solid and alternate links having openings therein. Thus, every two links define link-pairs, or link-units. For purposes of illustration, the link-units can be considered as having a standard, or nominal length, of eight inches.

It is desired to discharge continuously moving carriers as desired discharge stations, such as stations DS1 to DS4, known distances from the reference point RP. A running total is maintained of the distance of a particular carrier from the reference point, and mechanism is actuated at the desired discharge station to dump that carrier when the running total maintained for that carrier equals the known distance of the particular discharge station at which the load is to be discharged. A running total of the distance from the reference point to the carrier is maintained for each carrier in the system, and the distance of each discharge station in the system from the reference point is known.

In order to create a running total of the distance of each carrier from the reference point, the links, or link-units, between the carrier and the reference point can be counted, and the distance calculated as the product of that count times the standard length of a link-unit. Such a running total, however, would be sufficiently accurate only for a limited distance. At longer distances, the variation in the actual chain length, due to wear, stretching or other factors such as manufacturing tolerances, would vary too greatly from a standard length for accurate discharge at a desired station. Consequently, in the method of the present invention, the actual length of segments of the chain are calculated from the velocity of the continuously moving chain, as previously described.

The length of the segments chosen for calculation of actual length can be of any length, up to the full length of the chain. For example, the actual length of each individual link can be calculated, if the length of individual links vary to an extent which makes it improbable that very short lengths of chain can be estimated accurately by a count. On the other hand, the actual length of each link may be sufficiently close to the standard length of the link so that all but the most distant discharge station can be serviced adequately by discharging articles solely from a count of the links.

As a practical matter, it is more desirable to measure the actual length of segments which are longer than individual links but considerably shorter than the overall length of the chain. By way of example, a convenient segment length might be 15 link units, which has a standard length of 10 feet.

This does not mean that the standard lengths of link-units are ignored. In fact, each running total of length measurement which is maintained in the present invention is a mixture of actual segment and standard link-unit lengths. In the specific embodiment of the invention herein described, no actual length of a single link, or a link-unit, or, in fact, any number of links less than the number of links of the segment, is calculated.

After 15 link-units have been counted, the actual length of the segment comprising those links is measured in the manner previously described. Therefore, the running total for a particular carrier, at any instant, may contain standard lengths for link-units.

An examination of FIG. 21, in conjunction with FIG. 20, will indicate more clearly the method of controlling the discharge of the carriers by measuring the length of the chain between each carrier and the reference point.

A count of the link-units for each carrier is begun as each carrier moves past the reference point. In the example illustrated, the reference point sensor RPS is in the same vertical plane with the first sensing point SP1, and the final sensing point SP3 is approximately 15½ link-units (10 feet 4 inches) from the reference point RP. The second sensing point SP2 is spaced upstream less than one link-unit (that is, less than 8 inches) from the downstream sensing point SP3.

As the first carrier passes the reference point, the count of link-units for that carrier begins. As the carrier passes sensing point SPA (which is coaxial with sensing point SP2) and SPB (which is coaxial with sensing point SP3), the velocity of a link-unit is measured as described in conjunction with FIG. 15. It should be noted that since the distance between the sensing points SPA and SPB in FIG. 20 is less than the length of one link-unit, a unique portion of a link-unit can be sensed to arrive at the velocity of the chain, instead of a unique portion of the chain segment as described in conjunction with FIG. 15. After 15 link-units have passed the reference point, the first chain segment is measured as described in conjunction with FIG. 16. FIG. 16 represents the preferred embodiment of the method of measuring the length of a chain segment because the first sensing point LSP1 (corresponding to SP1 in FIG. 20) can be coaxial with the reference point RP in the system.

After the first carrier passed the reference point, and the count of link-units began, a length of 8 inches was inserted in the running total for the first carrier C1 for the first link-unit, and 8 inches was added to the running total for each subsequent link-unit counted. After 15 link-units have been counted, and the actual length (say, for example, 10 feet 1 inch) has been calculated for the segment defined by those 15 link-units, the actual length (10 feet 1 inch) is substituted in the running total for the accumulated standard length (10 feet) of the first 15 link-units. Thus, at this time, the running total shows that the carrier C1 is 10 feet 1 inch from the reference point.

The count of links begins again for the first carrier, and, for each subsequent link counted, an additional 8 inches is added to the running total. Thus, after 5 link-units of the second segment have been counted, the total number of link-units counted will be 20, the actual length of 15 link-units of which (the first segment) has been measured. Thus the instantaneous running total will consist of the actual length of the first segment (10 feet 1 inch) and the standard length of 5 link-units (the excess over the segment unit) which equals 40 inches, or 3 feet 4 inches. Thus the running total at that instant will consist of the actual length of 10 feet 1 inch plus the standard length of 3 feet 4 inches, or a total of 13 feet, 5 inches.

When the first carrier C1 passed the reference point RP, a first running total of the distance between that carrier and the reference point RP was begun for the first carrier. When the second carrier C2 passed the reference point RP, a second running total of the distance between the second carrier and the reference point was begun for the second carrier. Similarly, as each subsequent carrier passed the reference point a separate running total was begun for each of said carriers.

The nature of the count referred to above will now be described in more detail. Each link-unit, or link-pair, is sensed at sensing point SP1 and, for each link-unit sensed, 8 inches is added to all the running totals established for the carriers which have passed the reference point. For every 15 link-units sensed, a segment of chain is defined, and the actual length of that segment is measured, as described above, and the actual length of the segment is substituted in each running total established for the nominal lengths of the 15 link-units making up the segment (which lengths were previously entered into all the established running totals).

If the second carrier were connected to the chain exactly 15 link-units (that is, one segment) behind the first carrier, the second 15 link-units accumulated for the first carrier would be the first 15 link-units trailing the second carrier. Then, when the actual measurement of the segment was made, the actual length of the segment could be substituted for the standard length of the second 15 link-units trailing the first carrier and the first 15 link-units trailing the second carrier. The same synchronization would occur if the second carrier (and other carriers) were spaced at any even number of segments from the first carrier.

However, the second carrier need not, and in the normal course of events would not, be spaced an even number of segments (that is, a multiple of 15 link-units) from the first carrier. Suppose that the second carrier is connected to the chain 20 link-units from the first carrier. After the first carrier is 15 link-units past the reference point, the actual measurement of the segment (say 10 feet 1 inch) occurs. Thereafter, for each additional link-unit which passes the reference point, the standard eight inches is added to the running total for the first carrier. Thus, after 20 link-units have passed the reference point, the running total will be the actual length of the first segment (10 feet 1 inch) plus the standard length of 5 link-units (5×8 inches=40 inches; or 3 feet 4 inches) which totals 13 feet 5 inches.

Just after the second carrier passes the reference point, the twenty-first link behind the first carrier (which is the first link behind the second carrier) will pass the reference point, and the standard 8 inches will be placed in the running total for each carrier. At this time, then, the first running total for the distance between the first carrier and the reference point is 13 feet 5 inches plus 8 inches which equals 14 feet 1 inch. At the same time, the second running total for the distance between the second carrier and the reference point is 8 inches.

After the first carrier is 30 link-units from the reference point (and the second carrier 10 link-units from that point), the actual length of a second segment of 15 link-units is measured. If, for example, the second segment is 10 feet 2 inches, this distance is entered in the first running total for the first carrier in place of the standard length of 10 feet accumulated link-unit by link-unit. The substitution, however, cannot be made in the running total for the second carrier, since that running total consists only of 10 link-units, which is less than a full segment (15 link-units).

When the forty-fifth link-unit trailing the first carrier passes the reference point, the actual length of the third segment is measured. This actual length is then added to the running totals for both the first carrier and the second carrier, in place of the standard lengths of the segment accumulated link-unit by link-unit.

FIG. 21 represents a condition which might exist in a system of the present invention at one instant of time. It should be noted that the figures given in columns 1 to 5 need not necessarily be recorded; only the individual running totals given in column 6 would be carried, because it is only these running totals which are used to control the carriers (as by actuating mechanism at a desired discharge station when a particular carrier approaches the discharge station to dump the load from that carrier at that station). Other information carried includes the actual distance of each discharge station from the reference point. Thus, when the running total for a particular carrier (say 800 feet for carrier C3) equals (or exceeds) the actual distance from the reference point of the desired destination (station DS4) for that carrier, a signal is given to operate mechanism at that station to discharge the load from the carrier.

The apparatus of the present invention is shown in a conveyor system 10 (see FIG. 1) in which a plurality of carriers 12 are continuously moved, as indicated by arrow A, along an endless path 14. The conveyor system has one or more loading stations 16 (only one being shown in the exemplary system of FIG. 1) and a plurality of offload, or discharge, stations 18.

The system illustrated has an endless track 20, formed from I beams having a lower flange 22 (see FIGS. 4 and 6). The carriers 12 each have a trolley 26 which is suspended from the track 20. Yokes 28 on each trolley have rollers 30 which straddle the lower flange 22 to ride on the upper surface thereof. A plate 32 is connected between the yokes pivotally receives a rectangular carrier frame 34. A carrier tray 36 is pivotally connected to a horizontal platform 38 (FIG. 5) secured in the carrier frame.

An endless drive chain 40 is connected to each of the carrier yokes and, when driven, moves the carriers continuously about the endless track 20. The drive chain 40 is driven by a drive unit 42 (shown in FIG. 2) which is mounted on a platform 44. A motor 46 drives a sprocket 48 through a speed reducer 50. A short endless chain 52, having extending dogs 54 thereon, is received on sprocket 48 and an idler sprocket 56. One run of chain 52 passes adjacent to drive chain 40 for engagement of dogs 54 therewith so that motion is transmitted to chain 40 from the drive unit 42.

A takeup 58, as shown in FIG. 3, is provided to keep slack out of the drive chain. A loop is formed by a semicircular section 20a of track 20, the section 20a being mounted on a frame 62. Frame 62 is movably mounted on a stationary frame 64, and is connected thereto through biasing members 66. A semicircular array 63 of rollers is provided under track section 20a to guide the carrier trolleys around the semicircular turn. The section 20a is joined to other portions of track 20 through expansion joints 65 which maintain a continuous track even when the frame 62 is shifted. The biasing members 66 may comprise a pair of springs which are mounted on studs 67 connected to the stationary frame 64 and extending through a cross-member 62a of the slidable frame 62. The springs are received on the studs between end collars 68 thereon and the cross-member 62a of the slidable frame 62 to bias the frame 62, and the track section 20a, to take up slack in the chain 40 and thereby maintain the chain taut. As slack develops in the chain from wear and stretching, the springs shift slide 62 outwardly (to the left as viewed in FIG. 3) so that the length of the track increases as the length of the chain increases, thereby maintaining the chain taut.

The load station 16 is shown in FIG. 4. A loading conveyor 70 has power operated rollers 72 and terminates adjacent the path 14 of the carriers 12. The rollers 72 are turned on and off, for selective rotation, by a foot operated switch 74 so that the operator can control the movement of articles 75 up to the end of the conveyor. The operator then manually pushes the forward article 75 onto an empty carrier as the carrier moves through the loading station 16. Only articles having the same destination are loaded on a single carrier. As the operator pushes the different articles (which have labels indicating the offload station to which the articles are to be sent) onto carriers, the operator punches the destination code which he sees on the article label into a keyboard 76 in the load station.

An offload station 18 is shown in FIG. 5. An offload conveyor 78 is provided to receive articles dumped off the carrier tray at that particular station and carry the articles away, under the force of gravity or power driven rollers, and by an endless belt. Each carrier has an extending roller 80 which is aligned with a ramp 82 at each offload station. The ramp 82 has a level entry portion 82a, a shiftable switch portion 82b which is powered by ram 84, and a peak portion 82c. If a signal is transmitted to the offload station to indicate that the load on a particular carrier which is approaching the station is to be dumped at that station, the ram 84 is actuated. The actuation of the ram elevates the switch portion 82b, which has the upstream end pivotally connected to the downstream end of the entry portion 82a. When the switch portion 82b of the ramp is raised, the roller rolls over the peak portion 82c of the ramp to dump the tray. The downstream end of the peak portion returns to the level of the entry portion 82a of the ramp to lower the pivoted tray to the carrier platform. If no signal is transmitted to the offload station to dump the load from a particular carrier, the ram is not activated and the switch portion 82b of the ramp remains level. Thus the roller 80 does not traverse the elevated peak portion 82c of the ramp, and the carrier tray 36 is not pivoted on the carrier frame 34 to discharge its load.

The carriers 12, track 20, drive chain 40, drive unit 42, and takeup 58 are conventional elements well known in the art. Similarly, the conveyors 70 and 78 in the loading station and in the offload stations, respectively, are conventional units known in the art.

In the control system of the present invention, the desired station at which an article placed on a carrier must be offloaded is recorded by the operator on the keyboard 76 when the carrier is loaded. This data is stored in a memory, and a signal is generated (by means to be described) when the carrier reaches the predetermined offload station to dump the carrier tray and offload the article. The discharge of the article must occur during the short interval of time that the carrier (which is moving continuously) is in the offload station. Thus, means must be provided to determine quite precisely when each carrier has reached the offload station to which it was directed by the operator when the article thereon was loaded. In the system of the present invention, this accurate location of the carrier at a predetermined offload station is accomplished by continuously measuring the length of conveyor drive chain between the carrier and a reference point, and comparing that distance with the known distance (which has previously been recorded and stored in the memory) between the reference point and the predetermined offload station to which the carrier is directed.

One method of measuring the length of chain trailing a carrier would be to count the links passing a reference point and multiply the accumulated total number of links between the reference point and the carrier by the nominal, or standard, length of a link. Such a system, however, would be of questionable accuracy, particularly where the discharge stations are remote from the reference point. In the system of the present invention, the actual length of the chain is measured to assure accurate unloading at remote offload stations.

In the form of the invention illustrated in FIG. 1, five sensing functions are performed in tracking each carrier and establishing the instantaneous position of each. These functions are:

1. Sensing the carrier to locate the carrier at a known point.

2. Sensing the carrier in the load station to coordinate the entry of the destination data with the particular carrier being loaded.

3. Sensing the position of each carrier as it leaves a chain takeup loop to recalibrate the carrier position and thereby correct for any takeup in the chain resulting from lengthening of the chain.

4. Sensing each carrier as it approaches the chain link measuring station to define a reference point.

5. Sensing the chain at three spaced apart points, in a chain length measuring station, to determine the actual length of the chain, segment by segment.

A sensor 1S is positioned in the system 10 as shown in FIG. 1 to perform the sensing function described as sensing function 1, above; a sensor 2S is positioned in the system 10 as shown in FIG. 1 to perform the sensing function described as sensing function 2, above. A sensor 3S is positioned in the system 10 as shown in FIG. 1 to perform the sensing function described as sensing function 3, above; a sensor 4S is positioned as shown in FIG. 1 to perform the sensing function described as sensing function 4, above; and a chain length measuring station 1CLM, having sensors 5S1, 5S2 and 5S3 (FIG. 6), is positioned in the system 10 as shown in FIG. 1 to perform the sensing and measuring function described as sensing function 5, above.

Each of the sensors 1S, 2S, 3S, 4S, 5S1, 5S2 and 5S3 (FIGS. 1, 4 and 6) has an emitter 1SE, 2SE, 3SE, 4SE, 5S1E, 5S2E and 5S3E, each of which projects a beam 1SB, 2SB, 3SB, 4SB, 5S1B, 5S2B and 5S3B, respectively. The emitters are secured to track 20, as shown in FIG. 6, by means of frames 90. Detectors 1SD, 2SD, 3SD, 4SD, 5S1D, 5S2D and 5S3D are mounted, respectively, on the frames in the path of the projected beams. The beams 1SB, 2SB, 3SB and 4SB are interrupted by the yokes of the trolley to produce two signals as each carrier passes the respective sensors, only one signal of which is effective to indicate the presence of a carrier. The beams 5S1B, 5S2B and 5S3B (FIGS. 7 and 8) are interrupted by alternate links of chain to produce a single signal each time one link-pair, or link-unit, passes the sensor.

The chain length measuring station is shown in FIGS. 6, 7 and 8. The three sensors of the station (5S1, 5S2 and 5S3) are spaced apart along the path of the chain 40, in the manner previously described. In FIG. 8, the view of the chain 40 has been rotated 90° about the longitudinal axis of the chain to show that every other link 40a of the chain appears to the photodetector as an open link, which passes the beam from the photoemitter, and alternate links 40b appear to the photodetector as closed links, which block the beam from the photoemitter. Each pair of adjacent links 40a, 40b constitute a link-unit LU, and each link-unit extends from the trailing edge of one closed link to the trailing edge of the next closed link.

The axis 91 (FIG. 8) of sensor 4S defines the reference point RP of the system from which the fixed distance to the discharge stations, and the constantly changing distances to the carriers, is measured for comparison. The distance separating the axes 92, 94 of the beams of sensors 5S1, and 5S3 establishes a reference length identified as LREFL. The shorter distance separating the axis 96 of the beam of sensor 5S2 and the axis 94 of sensor 5S3 establishes a second reference length LREFV. The length LREFV is less than the length (FIG. 8) 90 of one link-unit but greater than the opening in an open link.

The length LSEG is the actual length of a segment of N link-units which, for purposes of illustration, is defined as 15 link-units. Since each link-unit has a nominal or standard, length of 8 inches, the nominal length of a segment is 10 feet. The distance LREFL between axes 92 and 94 is greater than the nominal length of 15 link-units but less than the nominal length of 16 link-units.

Before discussing in detail the apparatus with which the actual length of the segments is determined, the mode of operation of the apparatus will be discussed in a more general manner.

Sensor 5S1 detects and counts the link units which pass the sensor. Sensor 4S senses each carrier and initiates entry of the link count for the different carriers into a computer. Each of the sensors 5S1, 5S2 and 5S3 detect the motion of the chain because of the sensor beam is transmitted through open links but blocked by closed links.

It will be noted that, in FIG. 20, the reference point sensor RPS, which senses carriers, is in the same vertical plane as the first sensor SP1 of the chain link measuring station, which senses chain. The sensor SP1 counts links, and the sensor RPS initiates the entry of the count into the running total for the carrier sensed at that time. In the system of FIG. 1, however, the sensor which defines the reference point (4S) is spaced in front of the chain link measuring station, and in front of the first sensor 5S1 (FIG. 8) thereof. Nevertheless, the two sensors 4S (which senses the carriers) and 5S1 (which senses the chain) of FIGS. 1 and 8 function in the same manner as the sensors RPS and SP1 of FIG. 20. The sensor 5S1 continuously counts the chain link-pairs and the sensor 4S initiates entry of the count of link-pairs into the computer for the carrier which is being sensed. Since the velocity of link-pairs passing sensor 5S1 is identical to the velocity of link-pairs passing sensor 4S at any given time, the count at the two sensors would be the same and it is immaterial that one sensor is spaced along the chain path from the other.

FIG. 9 is a timing diagram depicting the sequence of signals derived from the photosensors 5S1, 5S2 and 5S3. The two-state condition of each photosensor is shown as a function of time which increases to the right along the abscissa. A dot identifies each transition from a state of beam-blockage to a state of beam-transmission. The time sequence of these transistions is noted along the event axis, which is shown parallel to the time axis. A transition of photosensor 5S2 is followed in time first by a transition of photosensor 5S1 and next by a transition of photosensor 5S3. This sequence repeats itself cyclically.

For continuous or intermittent motion in one direction, each transition of photosensor 5S1 in going from a condition of a blocked beam to a condition of a transmitted beam is used to signal the beginning of a time interval called DELT. When photosensor 5S2 undergoes a similar blocked-to-transmitted transition, that event signals the beginning of a second time interval called TAU. And a similar transition at photosensor 5S3 signals the termination of both time intervals DELT and TAU. The time intervals $DELT_i$ and $TAU_i$ measured with the passage of each period (i) in this cycle permit velocity and length measurements of the chain.

Following the signal from photosensor 5S3 that completes time intervals DELT and TAU, an undapted value for chain velocity VELTY is determined. This velocity is calculated using the expression $$VELTY = LREFV/TAU$$

After the signal from photosensor 5S3 which immediately follows in time the Nth, or fifteenth, signal from photosensor 5S1, the actual overall length of the N link-pairs just counted is determined. This is done by using the expression $$LSEG = LREFL - VELTY \times DELT$$

The values VELTY and DELT used in this calculation are the most recent ones acquired, that is the values determined after the last preceding signal from photosensor 5S3.

Having first accumulated the sum of the number N (15) of nominal link-pair lengths for these N link-pairs, and having just calculated the actual length LSEG of this same group of link-pairs, the running total of the distance the chain has traveled can be updated by subtracting from this distance the nominal length accumulated for the N number (15 in this example) of link-pairs and adding the calculated overall length LSEG.

The direction of chain travel, forward and backward, is sensed by taking advantage of the quadrature relationship between the two photosensors 5S3 and 5S2 with the open and closed links of the chain. (i.e., the fact that at no time do both photosensors 5S3 and 5S2 simultaneously experience change from beam blocking or beam transmission). Thus, if either photosensor is undergoing a transition from a condition of beam blockage to one of beam transmission, the direction of chain motion is differentiated by sensing the condition of the other photosensor, whether it is presently blocked or transmitted.

As photosensor 5S3 is used to terminate both measured time intervals TAU and DELT, the velocity that is determined from the expression VELTY=LREFV/-TAU above is a good approximation to the velocity of the chain during the interval DELT and is therefore appropriate to use for the calculation of length LSEG in expression (2). If the motion of the chain is not very uniform, some form of average value of velocity, based on earlier values for velocity calculated with the passage of each link-pair, can be used in the above expression.

Note that alternatively to using photosensor 5S3 to signal the termination of both time intervals TAU and DELT, a fourth photosensor can be added to the system to permit the photosensors 5S1 and 5S3 to define the length LREFL as before, but permit photosensors 5S2 and the fourth photosensor to independently define the length LREFV. This would make the two time intervals TAU and DELT asynchronous to one another. Four principal timing events are significant. These are:

(1) the start of time interval TAU
(2) the finish of time interval TAU
(3) the start of time interval DELT
(4) the finish of time interval DELT Two or four photosensors can be used for generating these events.

FIG. 22, there is shown a conveyor system having an endless conveyor chain wherein the system has been divided into a plurality of zones ZA, ZB and ZC. In this system, there is a single reference point which may, for example, be the sensor 3Sa although this sensor has another function. Offload stations (which may be similar to stations 18 of FIG. 1) are not shown but may be anywhere except within a take-up device and between a take-up device and the first carrier-detecting reference photosensor 3Sa, 3Sb, 3Sc or 3Sd downstream.

Carrier sensors 2Sa, 2Sb, 2Sc and 2Sd (which correspond in function to sensor 2S of FIG. 1) are photosensors which detect carriers that are (or are being) newly loaded. Their purpose is to cause the contents of the keyboard destination data input by the operator at the respective load station, to be transferred to the computer at a time appropriate to signal the association of this data with the carrier detected.

Carrier sensors 3Sa, 3Sb, 3Sc and 3Sd (which correspond in function to sensors 3S of FIG. 1) are located just after chain-slack tape-up devices and serve as reference positions at which carrier positions can be recalibrated (updated) to correct for errors incurred in passing through the take-up device.

The data of the chain link measuring station 1CLM, 2CLM or 3CLM of a zone is used to track a carrier through chain take-up devices located at the end of the zone or within the zone. The error in position of a carrier exiting a take-up device, incurred by the uncertainty of chain length taken up within the take-up device, can be eliminated by referencing the carrier position at the reference-position photosensor. This reestablishes an accurate position prior to the carrier arriving at the first offload station beyond the take-up device.

The conveyor system is designed such that no take-up device can vary the amount of chain it is taking up by more than $\pm \frac{1}{2}$ $(l_{min} - E_{error})$, where $l_{min}$ represents the minimum distance between any two adjacent carriers, and $E_{max}$ is maximum error ($\pm E_{max}$) that can be present within the position data for any carrier reaching a reference position photosensor. In this way, when a carrier is detected by 3Sa, 3Sb, 3Sc, or 3Sd, there is no ambiguity of which carrier has been detected.

UD1, UD2, UD3 and UD4 are photosensors used optionally to further improve the accuracy of chain-length measured data. These sensors detect the actual position of carriers after they have been tracked by the C.L.M. stations (1CLM, 2CLM, 3CLM) over a significant distance.

When sensors UD1, UD2 or UD3 detect a carrier, the carrier position is at that instant precisely known, i.e., it is positioned at the position of that photosensor. This known distance is compared with the computed distance that has resulted from the C.L.M. data. In this comparison, the error that has accumulated in the computer-calculated position can be assessed. This assessment in turn allows error trends to be recorded and their non-random part to be corrected internal to the computer by correcting the values of the system constants being used, i.e., either the reference length LREFL, the reference length LREFV, or the clock rate(s) used in timing TAU and DELT. In addition to, or instead of, correcting system constants to counteract non-random errors in calculated carrier positions as they arrive at the photosensors UD1, UD2 and UD3, the computer recorded positions of all the carriers within the respective zone can be corrected, after appropriate scaling.

A schematic representation of a computer controlled conveyor system using Chain-Length-Measuring Stations for carrier tracking is presented in FIGS. 10 through 14. Each figure presents a major segment of control activity; these are:

FIG. 10: Chain-Length-Measuring Station (1CLM)
FIG. 11: Updating of Distance Data
FIG. 12: Generation of Offloading Signals
FIG. 13: Entry of Payload Data
FIG. 14: Position-Update Carrier Sensing

CHAIN-LENGTH-MEASURING STATION (FIG. 10) (FIG. 8)

Sensor 5S1 resets and starts a timer 100 for measuring the time period DELT, which is the time between the instant that the trailing edge of a chain segment is sensed by 5S1 until the instant that the leading edge of the same segment is sensed by 5S3. Sensor 5S3 stops this timer.

Sensor 5S2 resets and starts a timer 102 for measuring the time period TAU, which is the time it takes a trailing edge of a link-pair of chain to travel the distance LREFV separating sensors 5S2 and 5S3. Sensor 5S3 stops this timer also.

At the time sensor 5S3 stops the timer for TAU, the measured time TAU is passed along to a divider 104 that performs the division LREFV÷TAU. This results in a determined chain velocity VELTY. After sensor 5S3 stops both timers simultaneously, and after a delay necessary to allow for the calculation of VELTY, both DELT and VELTY are made available to a circuit 106 which calculates a Correction Length, the difference of measured segment length (LREFL−VELTY×DELT) and its nominal length represented by an accumulation of N nominal link-pair lengths (N×NOMLK). A chain segment is defined in this system as a fixed number N of link-pairs. The formula used in the calculation of Correction Length is:

Correction Length=(LREFL−DELT×VELTY)−N×NOMLK.

NOMLK is the known nominal length of a link-pair of chain, where a link-pair is defined as one open link followed by one closed link. The terms "open" and "closed" refer to what the sensors would see, optically speaking. LREFL is the reference length separating sensors 5S1 and 5S3, and is the length used for comparison measurements of segment lengths.

Correction Lengths are not required with the passage of each and every link-pair, but only for contiguous, non-overlapping chain segments. For this purpose a roll-over counter 108 is used which generates a pulse each time it rolls over after counting N link-pairs past sensor 5S1. This pulse signals the passage of a new chain segment past sensor 5S1, and clears a flag (Flip-flop) 110. When the leading edge of this chain segment reaches sensor 5S3, a second pulse is generated to set this flag. The setting of the flag Flip-flop 110 triggers a One-shot delay 112 that allows time for the calculation of a Correction Length and then produces a gating pulse to latch the calculated Correction Length Data into an output latch 114. The same pulse passes through an OR circuit 116 to a gate a second latch 118 in series with the first latch 114. This second latch 118 presents the Correction Data as an output, and its presence as valid data is signaled by a New Data Strobe pulse from the output of the OR circuit. This New Data Strobe pulse occurs after a short delay 120 which allows time for the latched data to settle up.

With the passage of each link-pair past sensor 5S1, other than the N'th or last link-pair in a chain segment, the value NOMLK (nominal link-pair length) is latched through circuit 122 to the same output latch 118 as above for Correction Data, and is also accompanied by a New Data Strobe signal.

Thus, in summary, with the progression of chain length through a Chain-Length, Measuring Station, (1CLM), a continuous sequence of length increment data is presented at the final output data latch 118, each increment accompanied by a New Data Strobe signal. In between each occurrence of N successive increments of NOMLK data, i.e., at the completion of each successive chain segment, Correction Length Data appears which represents a correction factor to the accumulated length of the immediately preceding N number of NOMLK length encountered by sensor 5S1.

UPDATING OF DISTANCE DATA (FIG. 11)

FIGS. 11 and 22 show schematically how data from one or more Chain-Length-Measuring Stations is used to update the distances traveled by carriers on the conveyor system.

Locations of carriers around the loop of the conveyor chain are represented as distance traveled from the reference point, with the greatest distances being the entire length of the loop. A series of memory locations 130, 132, 134 are used to store the most recent values of distance (DIST) that each carrier has traveled past this reference point, that is, in effect, to store their locations. Chain length data from the C.L.M. stations 1CLM, 2CLM, 3CLM (any number of which can be used) is used to update these values of DIST for each carrier as the chain moves.

A C.L.M.-Station-Data Service Queue 136 senses, via the New Data Strobe signals (from FIG. 10), the presence of Distance Increment or Correction Data at any or all of the C.L.M. Stations. The main purpose of the C.L.M.-Station-Data Service Queue is to enable handling of data which may be presented simultaneously from two or more C.L.M. Stations, without losing any of this data. The C.L.M.-Station-Data Service Queue sequences all pending service requests from C.L.M. Stations and outputs signals to gates 138, 140, 142 which, one at a time, allow the data from the respective C.L.M. Stations to be passed through onto a Data Bus 144 that inputs to an Arithmetic Unit 146.

The Arithmetic Unit 146 receives this new Distance Increment or Correction Data from the bus along with a value of carrier position distance (DIST) from a memory register via a second bus 148, labeled "Bus, Last DIST". The Arithmetic Unit then adds these two data together to obtain an updated carrier distance and stores the new value of DIST back into the original memory register via a third bus 150, labeled "Bus, Updated DIST". During the writing of the new updated DIST into the memory register, a busy signal is presented for use by the Keyboard-Service-Request Queue 152 (see FIG. 13) to prevent it from writing data simultaneously into this same memory location.

The value of Distance Increment (NOMLK) or Correction Data is not added arbitrarily to all carrier-distance memory locations. As only the distance traveled by carriers lying within a particular zone (FIG. 22) serviced by a particular C.L.M. Station are to be updated by data from that station, the gate which permits the new data to be put onto the Distance Increment or Correction Data Bus is controlled also by a Comparator which compares the old value of DIST from a memory register to the minimum and maximum distances defining the limits of the respective zone for the C.L.M. Station being serviced. With each service request from a C.L.M. Station, the Data Service Queue must initiate the scanning of all carrier distance memory registers for values of DIST which lie within the zone of that C.L.M. Station, and allow the Arithmetic Unit to update the value of DIST stored therein. The scanning of registers is accomplished by initiating the scan of a register address counter/scanner 154 via the OR-ing of the Gate Selector Signals which are outputted by the Service Queue circuit 136. At the end of the scan, and End-of-Scan signal is sent from the Scanner back to the Service Queue to allow resetting of the output data latch from the C.L.M. Station and the handling of any pending service requests from other C.L.M. Stations.

The Address-Scanner circuit 154 addresses all DIST memory registers 130, 132, 134 in sequence from the first to the last, and with each new address it puts out on the Address Bus, it sends a Strobe signal to the Arithmetic Unit 146. If the value of DIST is not within range of the C.L.M. Station zone limits ("Max Zone Dist" and "Min Zone Dist"), the new data is not gated onto the Data Bus and an effective value of zero Distance Increment is added to the old data to obtain "new" but unchanged data. With the completion of one update of a DIST value, the Arithmetic Unit puts out an End-of-C.L.M.-Update signal to a Compare Unit 156 (see FIG. 12). At the completion of a compare operation, the Comparator passes an End-of-Compare signal to an Update Service Queue 158 (see FIG. 14). At the completion of an update service, an End-of-True-Position-Update signal is sent to the Address Scanner 154, allowing the Address Scanner to increment the address count by one and continue its scan.

GENERATION OF OFFLOAD SIGNALS (FIG. 12)

Along with each value DIST stored in a memory location 130, 132, 134 for a carrier, a destination position is stored 160, 162, the value stored being referred to as DEST. Furthermore, an Enable Flip-flop flag 164, 166 for each carrier is set or reset to enable or disable the comparing of the value of DIST to DEST for that carrier, that is to flag whether or not the information stored in DEST is a valid destination for a loaded carrier that has yet to be dumped off at an offload station. Every time the Address Scanner (see FIG. 11) scans the addresses of DIST registers 130, 132, 134, the Arithmetic Unit 146 emits an End-of-C.L.M. Update signal which strobes the Compare Unit to make the comparison between destination DEST and current distance DIST. Note that when the address of a DIST register appears on the Address Bus as generated by the Address Scanner 154 (see FIG. 11), the DIST, DEST, and Enable Flip-flop data corresponding to that address is automatically put onto the DIST Data Bus 168, the DEST Data Bus 170, and the Enable lines 172, respectively. If the Enable Flip-flop 164, 166 for the corresponding DIST address is set and the value of DIST exceeds DEST, the result of the DIST and DEST comparison will generate a Dump signal. This signal allows an Offload Station Decoder 174 to decode the value of DEST and generate an offload command signal at AND gates 176, 178, 180. If the corresponding offload station is locally enabled (i.e., is clear to receive packages), the command signal will effect the offloading of the payload from the carrier located at that offload station.

At the same time as the offload command is given, a signal is sent to reset the Enable Flip-flop 164, 166 to prevent more than one offload command from being given.

At the completion of a compare, an End-of-Compare signal is sent to the Update Service Queue 158 (see FIG. 14).

ENTRY OF PAYLOAD DATA (FIG. 13)

The on-load station or stations 16 have Keyboards 76 through which operators can type in destination codes for items being loaded onto carriers passing these stations. Along with the keyboard at each onload station, is a Carrier Sensor 2S which signals the time that the operator's keyboard data entry is to be accepted for the payload on that carrier. As more than one onload station may be used, a Keyboard-Service-Request Queue 152 must handle the keyboard service requests, made via the respective carrier sensors. This allows for requests which might be received simultaneously from more than one keyboard.

If the Keyboard-Service-Request Queue 152 detects a keyboard service request and is currently not receiving a busy signal from the DIST registers (see FIG. 11), it outputs three signals. The first signal is to a Register Selector 182 which increments its memory addressing count and outputs this address onto the memory Address Bus. The second signal selects the appropriate line 184, 186, 188 with which to strobe the distance position of the corresponding onload-station Carrier Sensor onto the DIST Data Bus. This loads the starting position of the newly loaded carrier, positioned at that onload station, into the DIST register 130, 132 addressed by the Register Selector 182. The third signal strobes the destination code entered into keyboard 76, 76a, 76b, onto the Keyboard Data Bus by way of which it reaches the Keyboard Code-to-DEST Decoder. The Keyboard Decoder 190 then decodes the operator's input destination code into a value of destination distance DEST and puts this onto the DEST Data Bus. The Keyboard Decoder then sends a write signal to the addressed DIST and DEST memory registers and sets the corresponding Enable Flip-flop 192, 194. In some instances no data appears on the Keyboard Data Bus. This can occur when an operator lets a carrier go by because it is to remain empty or because it already contains a payload that was loaded recently by a different onload station. Or in some cases, the operator will allow a previously loaded carrier to go by that was loaded during the previous loop of the conveyor but remains on the carrier because it could not offload at its destination due to a locally disabled offload station. In the above situations, the Keyboard-Code-to-DEST-Decoder circuit outputs a Write Disable signal to the Gate 196 controlling the writing of data into the DEST register. This allows the current destination DEST for that carrier to be maintained intact for another loop of the conveyor.

Note that the Register Selector 182 has a Power-up Reset to initialize it to a beginning register address when the system is first turned on. The distance chosen for this initialization is somewhat arbitrary.

POSITION UPDATE CARRIER SENSING (FIG. 14)

If chain distances are very long such that C.L.M. errors exceed the accuracy limits required for successful offloadings, or if the amount of chain in a chain take-up mechanism varies by an amount equal to the minimum carrier separation, then one or more carrier sensors will be required to correct or update carrier position data (DIST) at various locations around the chain loop. (Note that chain take-up devices are incorporated in the chain system to keep the chain in tension.)

One choice of locations for carrier sensors (corresponding to sensors 3Sa, 3Sb, 3Sc and 3Sd of FIG. 22) is to place one at the beginning point of each zone, and have the C.L.M. station for that zone immediately follow it in position ahead of the first offload station in that zone. This will give the greatest accuracy to those carriers within the zone which have traveled the least distance through the zone. Furthermore, if each of these Zone Reference Carrier Sensors is located after a take-up mechanism, with no offload stations situated in between the take-up and the C.L.M. Station, the position error incurred through the take-up can be immediately corrected for.

If the length of chain within a zone is very long, or chain tension can vary appreciably over the length of the zone, then one or more Update Carrier Sensors, designated UD1, UD2, UD3 and UD4 in FIG. 22, may be required.

FIG. 14 shows the way in which the signals from carrier sensors such as 3Sa, 3Sb, 3Sc etc. and UD1, UD2, UD3 etc. are used to correct the values of DIST stored in memory registers for each carrier detected. When the Update Service Queue 158 receives an End of Compare signal (see FIG. 12), it passes a signal to a Sensor Position circuit 198 from one of the pending service requests that have been stored for carrier signals received and not yet processed. If it is a service request from Update Sensor UDS1, for example, the Sensor Position circuit outputs onto a Position Bus the stored position (defined as a distance from the system reference point) of that carrier sensor. Along with this data, it strobes a Carrier Identifier circuit 200 which reads the DIST value currently on the DIST Data Bus and determines whether or not it differs from the Sensor Position data by a set amount, called the "Window". This window is one half the minimum distance separating two carriers. If the comparison is positive, an End of Search signal clears the Update Service Queue 158 for this service request and sends a Valid DIST Strobe to open a gate 202. The gate then passes the Position data on the Position Bus through to the DIST Data Bus along with a Write strobe.

After receiving the End-of-Search signal, the Update Service Queue sends out an End-of-True-Position-Update signal to the Address-Scanner-to-DIST-Registers circuit (see FIG. 11).

Although the best mode contemplated for carrying out the present invention has been herein shown and described, it will be apparent that modification and variation may be made without departing from what is is regarded to be the subject matter of the invention.

We claim:

1. Apparatus for controlling a conveyor carrier driven by an endless chain to discharge a load at a selected one of a plurality of discharge stations comprising means to store data representing the distance from a reference point to said selected discharge station, said chain including a plurality of link-units of predetermined nominal length with a predetermined number of link-units defining a chain segment, means for counting chain link-units to provide a running total of the nominal length of chain between the moving carrier and said reference point, means including spaced sensors for measuring chain segments for determining errors between the nominal and actual length of the measured chain segments, means for substituting the actual length of each chain segment for the nominal length of associated chain segment while continuing to maintain a running total of the length of chain which total includes the nominal length of any fractional segment, and means to select and discharge a load from said conveyor carrier when said running total equals the distance between the reference point and said selected discharge station.

2. Apparatus for controlling a conveyor carrier driven by an endless chain to discharge a load at a selected one of a plurality of discharge stations comprising means to store data representing the distance from a reference point to said selected discharge station, said chain including a plurality of link-units of predetermined nominal length with a predetermined number of link-units defining a chain segment of predetermined nominal length, means to measure the chain link-units to determine the nominal length of each of a plurality of chain segments trailing said conveyor carrier between the carrier and said reference point, means including spaced sensors for measuring the chain segments for determining errors between the nominal length and the actual length of the measured chain segments, means for periodically substituting the actual length of each chain segment for the nominal length of the associated chain segment while continuing to maintain a running total of the length of said trailing chain including the nominal length of any fraction of a segment beyond the reference point, means to compare data representing the actual total of the length of the full chain segments and the length of additional link-units of any partial segment of the trailing chain beyond the reference point to the data representing the distance between the reference point and said selected discharge station, means to generate a signal when said running total of trailing chain equals the distance from said reference point to said selected discharge station, and means to select and discharge the load from said conveyor carrier in response to said signal.

3. Apparatus for controlling a conveyor carrier driven by an endless link chain to discharge a load at a selected of a plurality of discharge stations comprising means to store data representing the distance from a reference point to said selected discharge station, said chain including a plurality of link-units of predetermined nominal length with a predetermined number of link-units defining a chain segment, means to count the link-units of chain trailing said conveyor carrier and downstream from said reference point to determine the nominal length of said trailing chain, means including spaced sensors to determine the actual length of chain segments downstream of said reference point, means to accumulate data representing a running total of the actual length of the segments and the nominal length of any additional link-units of said trailing chain downstream from the reference point, means including spaced sensors to compare said accumulating data representing said total of the length of trailing chain downstream from the reference point with the data representing the distance between the reference point and said selected discharge station, means to generate a signal when said accumulated data representing the total of the length of trailing chain downstream from the reference point equals the distance between the reference point and the selected discharge station, and means to select and discharge the load from said conveyor carrier in response to said signal.

4. Apparatus for controlling a conveyor carrier driven by an endless chain to discharge a load at a selected one of a plurality of discharge stations comprising means to store data representing the distance from a reference point to said selected discharge station, means to measurably divide the chain trailing the carrier into a plurality of chain segments of predetermined nominal length, means including spaced sensors to measure the velocity of each of the segments of the chain trailing said conveyor carrier after said carrier passes said reference point, means to separately time each chain segment passing a fixed gauge at said determined velocity of that segment to produce data representing the actual length of said segment, means to accumulate data representing a running total of the actual length of said trailing chain segments plus the nominal length of any fractional segment passing said reference point, means to compare said data representing the running total of the lengths of trailing segments and fractional segments passing said reference point to the data representing the distance between the reference point and said selected discharge station, means to generate a signal when the data representing the running total of the actual length of the trailing chain segments plus the nominal length of any fractional segment equals the data representing the distance from the reference point to said selected discharge station, and means to selected and discharge the load from said conveyor carrier in response to said signal.

5. Apparatus for controlling a conveyor carrier driven by an endless chain to discharge a load at a selected one of a plurality of discharge stations comprising means to store data representing the distance from a reference point to said selected discharge station, means to measure the elapse time required for a point on the chain to move a predetermined distance to produce data representing the velocity of the chain, counting means to divide the chain trailing the carrier into a plurality of chain segments of predetermined nominal length, means including sensors spaced a predetermined distance apart to accumulate data representing a running total of the actual length of said trailing chain segments plus the nominal length of any fraction of a segment passing said reference point, means to compare said data representing the running total of the actual lengths of trailing segments and the length of any fraction of a segment passing said reference point to the data representing the distance between the reference point and said selected discharge station, means to generate a signal when the data representing the length of the running total of the trailing chain segments and any fractional segment equals the data representing the distance from the reference point to select and discharge station, and means to select and discharge the load from said conveyor carrier in response to said signal.

6. Apparatus for controlling a conveyor carrier driven by an endless chain to discharge a load at a selected one of a plurality of discharge stations, said chain including a plurality of link-units of predetermined nominal length with a predetermined number of link-units defining a chain segment; comprising means to store data representing the distance from a reference point to said selected discharge station, means to measure the elapsed time required for a point on each segment of the chain to move a predetermined distance to separately produce data representing the velocity of each segment of the chain, means including spaced sensors to measure the elapsed time between the time the trailing edge of a chain segment moving at said velocity passes a first gauge point and the time the leading edge of said chain segment passes a second gauge point a predetermined distance from said first gauge point to produce data representing the actual length of said chain segment, means to accumulate data representing a running total of the actual length of said trailing chain segments plus the nominal length of any fraction of a segment passing said reference point, means to compare said data representing the running total of the actual lengths of trailing segments plus the nominal length of any fractional segment passing said reference point to the data representing the distance between the reference point and said selected discharge station, means to generate a signal when the data representing the running total of the trailing chain segments and any fractional segment equals the data representing the distance from the reference point to said selected discharge station, and means to select and discharge the load from said conveyor carrier in response to said signal.

7. Apparatus for controlling a conveyor carrier driven along a closed path by an endless chain to discharge a load from said carrier at a selected one of a plurality of discharge stations, said chain made of links of approximate equal length, said chain divided into segments of an equal predetermined number of links each, said apparatus comprising means to store data representing the distance along said path from a reference point to said selected discharge station, means to count the trailing links of said chain between the carrier and the reference point as they pass said reference point, means to record data representing a running total of the nominal lengths of links trailing said carrier as said links are counted, means including sensors spaced a predetermined distance apart to measure the time required for a fixed point on the chain to traverse a known distance along said path to obtain data representative of the velocity of the chain, means to measure the time between the instant the trailing edge of a segment moves at said velocity past a first gauge point to the arrival of the leading edge of said segment at a second gauge point a known distance from the first gauge point to produce data representing the actual length of said segment, means to substitute the actual length of a whole segment for the nominal length thereof after the actual length of each segment has been measured, and means to select and discharge a load from the carrier when the accumulated running total of the actual whole segment lengths plus the nominal lengths of the links of a fractional segment total the stored distance from the reference point to said selected discharge station.

8. Apparatus for controlling a plurality of conveyor carriers driven by an endless chain having a plurality of link-units of predetermined length around a closed path past a reference point to discharge their respective loads at predetermined discharge stations respectively, comprising; means to store data indicating the distance of each of said discharge stations from said reference point, means to maintain for each carrier a running total of the nominal length of the chain between that particular carrier and the reference point, means including a plurality of sensors spaced a predetermined distance apart and positioned to sense said chain for measuring chain segments for each carrier for determining errors between the nominal and actual length of the measured chain segments, substituting the actual length of each chain segment for each carrier for the nominal length of the associated chain segment while continuing maintaining a running total of the length of chain for each carrier, and means to select and discharge the load from each carrier when the running total of chain length between that carrier and the reference point equals the indicated distance of the predetermined discharge station for that particular carrier from said reference point.

9. Apparatus for controlling a plurality of conveyor carriers driven by an endless chain to discharge loads at predetermined discharge stations comprising means to store data representing the distance from a reference point to each of said discharge stations, means including sensor spaced a predetermined distance apart to measure the velocity of the chain, means to time one of a plurality of segments of predetermined nominal length passing a fixed gauge at said predetermined velocity to produce data representing the actual length of each segment, means to accumulate data representing a running total of the actual length of said trailing chain segments and the nominal length of any partial segment between each of said carriers, respectively, and said reference point, means to compare the running total for each of said carriers to the data representing the distance between the reference point and the desired discharge station for each of said carriers, means to generate a signal when the data representing the running total of the trailing chain segments for a particular carrier equals the data representing the distance from the reference point to said predetermined discharge station for that carrier, and means to select and discharge the load from said conveyor carrier in response to said signal.

10. Apparatus for controlling a plurality of conveyor carriers driven by an endless chain to discharge loads at predetermined discharge stations comprising means to store data representing the distance from a reference point to each of said discharge stations, means including spaced sensors to measure the elapsed time required for a point on the chain to move a predetermined distance to produce data representing the velocity of the chain, means to measure the elapsed time between the time the trailing edge of each of a plurality of chain segments of equal nominal length moves at said velocity past a first point and the time the leading edge of said chain segment moves past a second point a predetermined distance from said first point to produce data representing the actual length of each of said chain segments, means to accumulate data representing a running total of the actual length of said trailing chain segments plus the nominal length of any partial segment passing said reference point for each carrier, means to compare said running totals to the data representing the distance between the reference point and said predetermined discharge station for each carrier, means to generate a signal when the data representing the running total of the trailing chain segments for a particular carrier equals the data representing the distance from the reference point to the predetermined discharge station for that carrier, and means to select and discharge the load from said conveyor carrier in response to said signal.

11. Apparatus for controlling a plurality of conveyor carriers driven along a closed path by an endless chain to discharge loads from said carriers at predetermined discharge stations, respectively, said chain made of links of approximate equal length, said chain divided into segments of an equal predetermined number of links each, said apparatus comprising means to store data representing the distance along said path from a reference point to each of said discharge stations, means to count the trailing links of said chain between each carrier and the reference point as they pass said reference point, means to record data representing a running total of the nominal lengths of links trailing each of said carriers as said links are counted, means including a plurality of sensors spaced a predetermined distance apart to measure the time required for a fixed point on the chain to traverse a known distance along said path to obtain data representative of the velocity of the chain, means to measure the time between the instant the trailing edge of a segment moves at said velocity past a first point to the arrival of the leading edge of said segment at a second point a known distance from the first point to produce data representing the actual length of said segment, means to substitute the actual length of a whole segment for the nominal total of the links making up the segment after the actual length of each segment has been measured, and means to select and discharge a load from the carrier when the accumulated running total of the actual whole segment lengths plus the nominal lengths of the links of a fractional segment between a particular carrier and the reference point equals the stored distance from the reference point to the predetermined discharge station for that particular carrier.

* * * * *